United States Patent Office 3,101,251
Patented Aug. 20, 1963

3,101,251
PROCESS FOR PRODUCING MOLECULAR SIEVES
Peter A. Howell, Grand Island, N.Y., assignor to Union
Carbide Corporation, a corporation of New York
No Drawing. Filed Jan. 15, 1960, Ser. No. 2,576
23 Claims. (Cl. 23—113)

This invention relates to a process for producing synthetic crystalline zeolites of the molecular sieve type.

The zeolites hereinafter referred to are those crystalline metal aluminosilicates having a composition generally expressed by the formula:

$$\frac{M_2}{n} O : Al_2O_3 : XSiO_2 : YH_2O$$

wherein M represents a metal and $n$ represents its valence.

The crystalline zeolites contemplated in this invention consist basically of a rigid three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two, or $O/(Al+Si)=2$. The electrovalence of tetrahedron containing aluminum is balanced by the inclusion in the crystal of a cation, for example, an alkali or alkaline earth metal ion. One cation may be exchanged for another by various ion exchange techniques. The spaces between the tetrahedra are occupied by water molecules prior to dehydration or activation of the crystal.

The crystalline zeolites contemplated in the process of this invention include the rigid three-dimensional crystalline metal aluminosilicates structure capable of being dehydrated or activated to form molecular sieves, such as those described in greater detail in U.S. Patents 2,882,243, sodium zeolite A and process; and 2,882,244, sodium zeolite X and process. The process of this invention may also be used to prepare synthetic counterparts of naturally-occurring hydrated rigid three-dimensional crystalline metal aluminosilicate structures dehydratable to molecular sieves such as faujasite, chabazite, gmelinite, analcite, mordenite, and erionite.

Generally, any particular crystalline zeolite will have values for X and Y, in the above formula, that fall in a definite range. The value X for a particular zeolite will vary somewhat since the aluminum atoms and the silicon atoms occupy essentially equivalent positions in the crystal lattice.

The various types of crystalline molecular sieve zeolites may among other ways be differentiated on the basis of adsorption pore size or the operative diameter defined by the crystal structure. They are also distinguishable by virtue of the particular cation or cations such as sodium or calcium which have been integrated into the crystal.

Among the ways of identifying crystalline zeolites of the molecular sieve type and distinguishing them from other crystalline substances, the X-ray powder diffraction pattern method has been found extremely useful. This technique, preferably associated with the chemical analysis of the crystalline product, is a reliable means of identification. For instance, if one were to rely on chemical analysis alone, it would be difficult to accurately distinguish a true crystalline zeolite from a chemically similar but structurally different material such as sodalite or hydroxy-sodalite. Hydroxy-sodalite is a felspathoid material having the formula:

$$[Na_2O \cdot Al_2O_3 \cdot 2SiO_2 \cdot XNaOH \cdot H_2O]$$

unlike the crystalline zeolites of the molecular sieve type here discussed, NaOH fills the cavities of the structure.

In other sodalite-type materials, the occluded substance may be, for example, sodium halide or various sulfates and nitrates. Consequently, sodalite-type materials do not exhibit the adsorption characteristics of crystalline zeolites of the molecular sieve type.

In the prior art it has been reported that various clays may be mixed with solutions of alkali hydroxides and carbonates to give materials identifiable by chemical analysis, without evidence as to structure, as alkali aluminum silicates. Clay-sodium hydroxide mixtures have, according to the literature, been heated under pressure and purported to give a product resembling a zeolitic material; however, there is no definitiveness or certainty about the nature of the material obtained, but in view of our present knowledge it was more probably a composition of the sodalite type described above.

Various methods are known for preparing crystalline zeolites of the molecular sieve type from standard commercial reactants which include sodium silicate, silicic acid, colloidal silica sols, silica gel, alumina and sodium aluminate.

Although the known processes for preparing crystalline zeolites of the molecular sieve type are satisfactory for demonstrative and limited production purposes, economic considerations require a process employing lower-cost reactant materials, preferably where a reduction in the number of reactant mixing steps can be realized.

It is therefore an object of the present invention to provide a process for the efficient production of rigid three-dimensional crystalline zeolites dehydratable to molecular sieves.

A further object is to provide a process for producing synthetic crystalline zeolites utilizing a relatively inexpensive starting material.

In brief, the present invention relates to a process for producing crystalline zeolites of the molecular sieve type which comprises providing a starting mixture or compound which includes a major portion of a $SiO_2$-containing mineral and a minor portion of alkali, fusing said mixture, then treating the fused mixture as part of an aqueous reactant mixture also containing such predetermined proportions as may be required of sodium silicate or alkali metal silicate and/or sodium aluminate or other aluminum-containing material and digesting this reactant mixture until crystals of the desired zeolite are formed. The aqueous reactant mixture, subsequent to mixing of the mineral therein, contains in the aggregate, silicate ions, aluminate ions, alkali metal ions, hydroxyl ions and/or other anions in proportions which are known to yield the desired crystalline zeolite.

The mineral starting materials found to be useful in the practice of the invention are those minerals having in their initial composition sufficient amounts of Si and/or Al, or compounds thereof to provide at least a portion of the basic $SiO_4$ and $AlO_4$ molecules essential to the tetrahedral zeolite framework. In prior art methods, all of the silica component has generally been furnished by materials such as silica gel, silicic acid and sodium silicate. Similarly, the other basic component, aluminum, has had to be furnished entirely by alumina-containing materials such as sodium aluminate, activated alumina, gamma alumina, alpha alumina or alumina trihydrate. Although these various compounds have been successfully utilized in the preparation of crystalline molecular sieve zeolites, they constitute a relatively expensive form of starting material. Therefore, to provide a product having more desirable commercial aspects, the need has heretofore existed and is continually increasing for a synthesis process amenable to the use of readily obtainable, relatively low cost raw or starting materials constituting a substantial portion of the reactant mixture requirements.

In the classes of materials which are found to be useful in the process of the present invention, the ratio of silica to alumina occurring therein covers a rather wide range. For example, there are certain clays as attapulgite, which has an $SiO_2/Al_2O_3$ ratio of about 5 to 9, and bauxite with an $SiO_2/Al_2O_3$ ratio of less than one. It should be noted that not all clays are adaptable to the invention, such clays for instance as the kaolin type are not particularly suitable in the method of the present invention, because the temperatures employed are not sufficiently high to convert the kaolin-type structure to the reactive condition required to provide a substantial degree of conversion in subsequent steps to crystalline zeolites of the molecular sieve type. It has been found that kaolin-type materials when treated according to the method of the present invention usually yield hydroxy-sodalite rather than a crystalline zeolite as the major product.

Various volcanic rocks are known to contain in their composition the required silica and alumina in preferred proportions. Illustrative of such materials are basalt, obsidian and perlite in which the $SiO_2/Al_2O_3$ ratio is between 8.9 and 12.8. These particular materials are considered to be silica-rich and as a consequence require subsequent addition of $Na_2O$ and $Al_2O_3$ in suitable amounts to adjust the aqueous reactant mixture oxide ratios in accordance with the species of crystalline zeolite desired.

A number of other minerals herein listed have also been utilized in the present process with favorable success. Among such minerals are andalusite, albite and clinoptilolite. Albite ($Na_2O \cdot Al_2O_3 \cdot 6SiO_2$) is an example of a mineral which, when suitably treated, in accordance with the disclosed method, provides substantial portions of three major components for molecular sieve zeolite synthesis. Various aluminum silicates such as andalusite and kyanite, ($Al_2O_3 \cdot SiO_2$) when suitably treated also provide reactive $Al_2O_3$ and $SiO_2$ suitable for molecular sieve zeolite synthesis. Natural zeolites such as clinoptilolite or mordenite are also among the materials which can be treated by the invented process and used in the further production of zeolites such as sodium A and sodium X with favorable results. Highly siliceous minerals such as diatomite and tripoli have been found to give satisfactory yields of zeolites and particularly sodium zeolite A and sodium zeolite X. In the process of the invention, one or more silica-rich minerals or materials can be used, such as perlite in combination with one or more alumina-rich minerals or materials such as bauxite. In each instance, though, the mineral or combination is used only after blending and thermal treatment with alkali metal hydroxide to adjust the composition of the reactant mixture with such amounts of $Na_2O$, $Al_2O_3$, $SiO_2$ and $H_2O$ as may be required to produce the desired crystalline zeolite. Referring to Table I, there is listed a series of some minerals useful in the present process, with the molar composition thereof; it will be noticed that the molar ratio of $SiO_2$ to $Al_2O_3$ varies within the range of about 1:1 to about 13:1.

desired $Na_2O/SiO_2$ ratio. The value of this ratio is contingent on two factors: one, the particular type of zeolite to be produced, and secondly, the chemical composition of the raw mineral itself. For instance, it is known that for crystalline zeolites such as sodium zeolite A and sodium zeolite X there are preferred reactant compositions specified in terms of mole ratios of $Na_2O/SiO_2$, $SiO_2/Al_2O_3$ and $H_2O/Na_2O$, so that when such reactant mixtures are treated under particular conditions, the desired crystalline zeolitic species will result. This concept is explained more fully in relation to subsequent steps of the process and in U.S. Patents Nos. 2,882,243 and 2,882,244.

Preparation of the required starting material for the synthesis process may be accomplished satisfactorily by any of several methods. For instance, the mineral containing alumina and silica in known proportions and in finely-divided form preferably less than 30-mesh, is combined with a mixture of alkali metal hydroxide and water in suitable proportions to conveniently disperse the alkali metal hydroxide and provide a particular $Na_2O/SiO_2$ ratio. The resulting aqueous mixture of mineral and alkali metal hydroxide may then be partly dehydrated or dried to remove excess moisture alternatively; it may be placed directly into an oven or other heating apparatus.

The dehydrated compound is then heated and fused at a temperature between about 330° C. and 370° C. for a suitable period of time, usually at least about 8 hours. During this thermal treatment step, the aluminosilicate components originally present in the natural mineral are believed to be broken down into a more active condition, that is, smaller aluminosilicate units may be formed. These units, then, help to create the rigid, uniform, three-dimensional crystalline structure during the subsequent digestion step of the process. If the fusion product is predominantly a $SiO_2$-containing material, it will be in a more reactive state to combine with the $Al_2O_3$ and other components of the reactant mixture to be digested. The intimate contact established between the alkali and the starting raw material, by virtue of the fusion step, is found to be advantageous in terms of the yield of crystalline zeolitic material obtained in subsequent steps of the process.

By way of comparison, experience has shown that the mere digestion of a ground raw material such as a clay or volcanic rock without the previous step of incorporating the alkali, as noted above, usually results in the formation of relatively large amounts of hydroxy-sodalite or quantities of unconverted mineral rather than the desired crystalline zeolite.

After the mineral and the alkali metal hydroxide are combined in the firing or fusion step, the fused material is reduced to a finely-divided state for incorporation in the aqueous reactant mixture. The said mixture is prepared in accordance with the species of crystalline zeolite

TABLE I

*Typical Molar Compositions of Some Useful Minerals*

| Material | Na₂O | K₂O | Al₂O₃ | SiO₂ | Fe₂O₃ | CaO+MgO | L.O.I. |
|---|---|---|---|---|---|---|---|
| Perlite (unexpanded fines from Socorro, N. Mex.) | 0.54 | 0.50 | 1.00 | 12.8 | 0.13 | | 1.97 |
| Pumice (Millard County, Utah) | 0.41 | 0.44 | 1.00 | 8.88 | | | 1.52 |
| Andalusite (White Mountain, Mono County, Calif.) | | | 1.00 | 0.98 | | | |
| Albite (Amelia Court House, Va.) | 0.91 | 0.02 | 1.00 | 5.62 | | 0.43 | 1.1 |
| Kyanite (Clarksville, Ga.) | | | 1.00 | 1.69 | 0.01 | | 0.11 |
| Clinoptilolite (Hector, Calif.) | 0.70 | 0.06 | 1.00 | 8.95 | | 0.20 | 5.73 |

In accordance with the preferred method of the invention, a suitable raw mineral having essentially in the composition thereof silica and alumina, is intimately contacted with an alkali material such as sodium hydroxide in sufficient amount to achieve within the resulting mixture a desired and comprises a composition identified in terms of oxide-mole ratios, corresponding to:

$R_2O/SiO_2 = a$
$SiO_2/Al_2O_3 = b$
$H_2O/R_2O = c$ wherein the particular values of $a$, $b$ and $c$ in the system are the essential determinants, and where R is alkali metal. For example, it has been determined that in preparing sodium zeolite A, suitable ranges of reactant compositions, in terms of oxide-mole ratios, are:

|  | Range I | Range II |
|---|---|---|
| $Na_2O/SiO_2$ | 1.0-3.0 | 1.3-2.5 |
| $SiO_2/Al_2O_3$ | 0.5-1.3 | 0.8-3.0 |
| $H_2O/Na_2O$ | 35-200 | 35-200 |

A preferred reactant composition for producing sodium zeolite A, in terms of oxide-mole ratios, is:

$$Na_2O/SiO_2 = 1.4$$
$$SiO_2/Al_2O_3 = 1.75$$
$$H_2O/Na_2O = 40$$

Similarly, for producing sodium zeolite X, suitable ranges of reactant compositions, in terms of oxide-mole ratios, are found to be:

$$Na_2O/SiO_2 = 1.2-1.5$$
$$SiO_2/Al_2O_3 = 3-5$$
$$H_2O/Na_2O = 35-65$$

A preferred reactant composition for producing sodium zeolite X, in this respect, is:

$$Na_2O/SiO_2 = 1.4$$
$$SiO_2/Al_2O_3 = 5.0$$
$$H_2O/Na_2O = 35$$

To properly adjust the reactant mixture into the desired oxide mole ratios, sufficient addition silica, as may be required in the form of alkali metal silicate, silicic acid, silica gel, or colloidal silica sol, may be added. Also, additional alumina as may be required in the form of alkali metal aluminate, alumina trihydrate or other alumina-containing material are used to enrich the reactant mixture.

Digestion of the aqueous reactant mixture subsequent to incorporation of the mineral material may be accomplished by either a one-step or two-step process. When the latter is employed, the first or digestion step is conducted preferably at about room temperature (20°-25° C.).

In the second step, or if digestion is to be accomplished in a single step, the aqueous reactant mixture is maintained at a temperature of between about 20° C. and 120° C. and preferably in the range of about 75° C. to about 100° C. or slightly higher until crystals of the desired species form. The pressure at which digestion is conducted is atmospheric, or at least a pressure corresponding to the vapor pressure of water in equilibrium with the reactant mixture at the higher temperature. The entire digestion and crystallization steps may be conducted at about room temperature if a sufficient length of time is allowed, thus combining both the first and second steps into one.

In the manufacture of crystalline zeolites of the molecular sieve type on a commercial scale, higher temperatures such as 75° C. to 100° C. are desirable to promote the crystallization process and thereby achieve more practical processing times. In the digestion temperature range of 75° C. to about 100° C., crystallization times of between 1 and 72 hours may be used, or longer if digestion temperatures at or about room temperature are employed. The preferred crystallization temperature of about 100° C. is particularly advantageous in this process, since it is easy to maintain as by water baths, oil baths, sand baths, ovens, jacketed autoclaves, direct introduction of steam and the like. When crystallization temperatures beyond about 120° C. are used in this process, the product purity or amount of crystalline zeolite of the molecular sieve type in the solid product tends to decrease below levels useful in adsorption service, while hydroxy-sodalite and other aluminosilicate materials occur in increasing concentrations.

When reactant compositions outside the range or ranges given above for a particular species of crystalline zeolite are used, admixtures of more than one species may be produced, or larger than minor amounts of other crystalline zeolites, hydroxy-sodalite, or amorphous substances may appear in the solid product.

After a sufficient digestion-crystallization period, the reactant solution is filtered to separate the crystalline zeolite product from the mother liquor. The reaction magma may be filtered at the reaction temperature if desired or hot magmas may be cooled to room temperature before filtering. The filtrate or mother liquor may then be reused after enrichment with the proper amounts of reactants to give a properly proportioned reactant mixture. The mass of zeolite crystals is washed (conveniently on the filter) until the effluent wash water, in equilibrium with the zeolite, has a pH of between 9 and 12.

Thereafter, the crystals are dried conveniently in a vented oven at a temperature of between about 25° C. and 150° C. For X-ray and chemical analysis this drying is sufficient. The individual crystals, for example in the case of sodium zeolite A, usually appear to be cubic. Most of the crystals have a size in the range 1 micron to 5 microns, but smaller and larger crystals can occur covering the size range of 0.4 micron to 15 microns. After being washed and dried, the crystalline zeolite product may be identified by X-ray diffraction, adsorption and chemical analysis.

In the examples which follow, at least one X-ray diffraction spectrometer trace was secured of every product and intermediate product. From these traces the crystalline species present were identified. When proper controls were run (standard zeolites in the same hydration state run on the same day), estimates of percent composition could be made by comparing the intensities of certain X-ray lines in the product with the intensities of the same lines in the standard. As used herein, the terms "product purity" in percent and "product composition" in percent, when based on the X-ray method of analysis described above, are defined as $$\frac{\text{Sum of intensities of suitable X-ray lines measured on the sample}}{\text{Sum of intensities of the same X-ray lines measured on the reference standard}} \times 100$$

Adsorption measurements on samples of the products obtained by the process of this invention were carried out in a McBain adsorption system. The reference standards by which the relative purity of the products was determined were very pure samples of the corresponding zeolite species prepared by the known synthesis method from conventional reactants, i.e., sodium silicate, sodium hydroxide and sodium aluminate. As used herein, the terms "product purity" in percent and "product composition" in percent, when based on this adsorption method of analysis, are defined as $$\frac{\text{Weight loading of adsorbate measured on the sample}}{\text{Weight loading of adsorbate measured on the reference standard}} \times 100$$

The products of the invention may readily be ion-exchanged to other ion forms by employing conventional ion exchange methods.

Illustrative of the process described hereinabove, using a sodium hydroxide fusion treatment of the starting and a single-step digestion-crystallization procedure, a series of synthesis preparations was performed to determine the amount of crystalline sodium zeolite A produced from a variety of starting materials. The reactant mixtures based on the treated mineral employed in this particular series were suitably adjusted to have a composition characterized by oxide-mole ratios as follows:

$$Na_2O/SiO_2 = 1.4$$
$$SiO_2/Al_2O_3 = 1.75$$
$$H_2O/Na_2O = 40$$

which composition has been found to yield considerable quantities of sodium zeolite A. The results of these tests are shown in Table II which includes a number of raw materials found to be acceptable in the practice of the invention, the source of such material and the amount of sodium zeolite A produced along with minor amounts of other alumino-silicate materials. While there is rather wide range of values of product purity indicating varying degrees of utility of these several materials, it is clear that those such as perlite (95%), andalusite (90%), kyanite (80%) and albite (88%) are particularly useful in this process.

In a similar manner, aqueous reactant mixtures based on treated minerals according to the preferred method of the invention were prepared to determine whether sodium zeolite X could be obtained; Table III shows a compilation of the data obtained. As may be seen, these raw materials yielded quantities of sodium zeolite X in percentages ranging from 25% for up to a maximum value of 90% for perlite. The minerals perlite, clinoptilolite, kyanite and tripoli, when treated by the process of the invention, are found to be particularly useful.

A further understanding of the invention may be had from the following examples for the preparation of sodium zeolite A($Na_2A$), and sodium zeolite X($Na_2X$) by a preferred embodiment of the process:

EXAMPLE I

From a batch of unexpanded perlite (fines from Socorro, N.Mex.), 15.9 grams were weighed out and combined by stirring with 12.5 grams of sodium hydroxide and 22.2 grams of water. This perlite had been determined by analysis to have the following composition in terms of oxide-moles:

$0.54Na_2O \cdot 0.5K_2O \cdot 0.13Fe_2O_3 \cdot 1.0Al_2O_3 : 12.8SiO_2 \cdot 1.97H_2O$ The mixture, contained in a beaker, was partly dried in an oven at 110° C. for 1.5 hours, after which it was transferred to an oven maintained at 330° C. After 16 hours the beaker was removed from the oven.

The fused product was ground and 17.5 gram sample weighed out. This was blended with 127.9 grams of water and 13.9 grams of a sodium aluminate solution containing 31.0 wt.-percent $Na_2O$, 45.1 wt.-percent $Al_2O_3$ and 23.0 wt.-percent $H_2O$. The composition of reactant mixture

TABLE II

Results of Syntheses using $Na_2A$ Reactant Compositions

| Raw material | Source | Product composition [1] | |
|---|---|---|---|
| | | By X-ray | By sorption |
| A. Clay materials: | | | |
| Attapulgite | Attapulgus, Ga | 42% A | |
| Bauxite | Bauxite, Ark | 53% A | |
| Diaspore clay | Near Rosebud, Mo | 63% A, 5% X | 59% A, 7% X. |
| Illite | Morris, Ill | 27% A, 21% C | 17% A, 20% C. |
| Toadstone | Middleton, Nova Scotia | 50% A, 15% C, tr. Q. | |
| B. Volcanic rocks: | | | |
| Basalt | Summerset, N.J | 15% C, 19% A | |
| Obsidian | Lake Co., Oreg | 73% A, 16% C | 51% A, 15% C. |
| Perlite | Florence, Colo | 90% A, 10% C | 76% A. |
| Do | Socorro, N. Mex | 95% A, tr. C | 83% A. |
| Pitchstone | Deming, N. Mex | 48% A, 24% C | 40% A, 22% C. |
| Pumice | Millard Co., Utah | 70% A, 30% C | |
| Rhyolite | Iron Mt., Mo | 25% A, 75% Ry | 36% A. |
| C. Other minerals: | | | |
| Andalusite | White Mt., Mono Co., Calif | 80% A, 22% C | |
| Do | Bautista Canyon, Calif | 90% A | 85% A. |
| Albite | Amelia Court House, Va | Ab, 88% A | 60% A. |
| Clinoptilolite | Hector, Calif | 43% A, 25% C | |
| Dumortierite | Pershing Co., Nev | 76% A, 10% C | |
| Kyanite | Minas Gerais, Brazil | 80% A | 85% A. |
| Mordenite | Nova Scotia | 32% A, 28% C | |
| Nepheline | Dunngannon Twp., Ontario | 50% A, 18% C | 33% A, 16% C. |
| Nepheline Syenite | Ontario | 53% A, tr. Ne-Sy. | |
| Nepheline-Sodalite-Syenite | Red Hill, N.H | 66% A, 10% C | |
| Pyrophyllite | Moore Co., N.C | 49% A, 32% C | |
| Do | Indian Gulch, Calif | 50% C, 10% A, Pyr. | |
| D. Siliceous materials: | | | |
| Diatomite | Kittitas Co., Wash | 60% A, 16% C | 70% A, 18% C. |
| Silica flour | Innis, Spieden & Co. Grade 1160 | 76% A, 10% C, 10% quartz. | |
| Tripoli | Rogers, Ark | 83% A, 17% Q | 84% A. |

[1] A, A type zeolite; C, hydroxy-sodalite; Q, quartz; Ab, albite; Ky, kyanite; Ne, nepheline, Pyr., pyrophyllite; Ry, rhyolite; tr., trace.

TABLE III

Results of Syntheses using $Na_2X$ Reactant Compositions

| Raw material | Source | Product composition [1] | |
|---|---|---|---|
| | | By X-ray | By sorption |
| A. Volcanic rocks: Perlite | Socorro, N. Mex | 86% X | 90% X. |
| B. Other minerals: | | | |
| Albite | Amelia Court House, Va | 53% X, 17% Ab | |
| Clinoptilolite | Hector, Calif | 76% X, tr. C | |
| Kyanite | Minas Gerais, Brazil | 88% X | 81% X, +C. |
| Mordenite | Nova Scotia | 58% X | |
| Nepheline-Sodalite-Syenite | Red Hill, N.H | 38% X, tr. B, C | |
| C. Siliceous materials: Tripoli | Rogers, Ark | 76%, 20% B | 86% X, +B. |

[1] B, type B zeolite; X, type X zeolite ($Na_2X$); C, hydroxy-sodalite; Ab, albite; tr., trace.

then had a composition in terms of oxide-mole ratios as follows:

$$Na_2O/SiO_2 = 1.31$$
$$SiO_2/Al_2O_3 = 2.0$$
$$H_2O/Na_2O = 38$$

This reactant mixture was heated on a steam bath at 100° C. for 2.1 hours. The solids were separated from the mixture by filtration, and washed with distilled water to a pH of 10 to 10.5. After drying at 110° C. in an oven, a sample was submitted for X-ray and adsorption analysis. X-ray spectrometer tracings characterized the product as about 76% $Na_2A$. By adsorption measurements the product was found to contain about 65% $Na_2A$ plus some amorphous material.

EXAMPLE II

Using a 20.0-gram quantity of perlite from the same lot of fines used in Example I, the procedure of Example I was repeated. After fusion, the mixture was adjusted to give a composition in terms of oxide-mole ratios corresponding to:

$$Na_2O/SiO_2 = 1.4$$
$$SiO_2/Al_2O_3 = 1.75$$
$$H_2O/Na_2 = 40$$

Adsorption measurements on a sample of the digestion product indicated an $Na_2A$ content of 82%.

EXAMPLE III

A sample of kyanite (less than 8-mesh) weighing 24.4 grams was combined with 27.2 grams of sodium hydroxide and 32.0 grams of water. Fusion was conducted at 350° C. for 16 hours. From the fusion product 23.0 grams were weighed out and combined with 9.1 grams of a sodium silicate containing 19.3 wt.-percent $Na_2O$, 36.6 wt.-percent $SiO_2$, and 44.1 wt.-percent $H_2O$, and 127.9 grams of water. The resultant mixture had a composition in terms of oxide-mole ratios corresponding to:

$$Na_2O/SiO_2 = 1.52$$
$$SiO_2/Al_2O_3 = 1.74$$
$$H_2O/Na_2O = 37.0$$

The reactant mixture was digested at 95°–97° C. for 4 hours. After the solids had been filtered, washed and dried, X-ray analysis indicated an $Na_2A$ content of 95%. Adsorption measurements characterized the product as 83–87% $Na_2A$.

EXAMPLE IV

In a 400-ml. beaker nested in a 1-liter beaker 69.2 grams of sodium hydroxide were dissolved in 50 ml. water. To this was added 20.0 grams of finely-divided kyanite having a molar $SiO_2/Al_2O_3$ ratio of 1.0. The 400-ml. beaker was covered with a watch-glass and placed in an oven at 350° C. The mixture was heated at 350° C. for 40 hours. The main portion of the resulting fused solids was a soft, friable white mass weighing about 39 grams. Of this, 10.0 grams were blended with 34.6 grams sodium hydroxide, 81.1 grams of water and 50.3 grams of an aqueous colloidal silica sol containing 29.7 wt.-percent $SiO_2$ to give a mixture having the following composition in terms of oxide-mole ratios:

$$Na_2O/SiO_2 = 1.4$$
$$SiO_2/Al_2O_3 = 5.0$$
$$H_2O/Na_2O = 15$$

This mixture was digested for 64 hours at 100° C. The mixture was then filtered, washed with distilled water to pH 10 to 10.5 and oven-dried for several hours at 100° C. X-ray analysis of a sample of the product indicated an $Na_2X$ content of about 88%. Adsorption measurements characterized the product as containing from 77 to 86% $Na_2X$, the remainder being $Na_2C$ (hydroxy-sodalite).

EXAMPLE V

In a nickel crucible nested in a 400-ml. beaker, 9.4 grams of sodium hydroxide were dissolved in 10 grams of water. To this was added 10.0 grams of clinoptilolite, a natural zeolite. The beaker was covered with a watch-glass and heated in an oven at 350° C. for 16 hours. To 8.1 grams of the fusion product were added 2.5 grams of a sodium aluminate containing 31.0 wt.-percent $Na_2O$, 45.1 wt.-percent $Al_2O_3$ and 23.0 wt.-percent $H_2O$, and 48.3 grams of water. The reactant mixture had a composition in terms of oxide-mole ratios corresponding to:

$$Na_2O/SiO_2 = 1.4$$
$$SiO_2/Al_2O_3 = 5$$
$$H_2O/Na_2O = 35$$

This mixture was digested for 24 hours at 100° C. The solids were separated from the liquor by filtration, washed with distilled water to a pH of about 10, and oven-dried at 110° C. X-ray analysis of a sample of the product showed an $Na_2X$ content of 76%, along with a trace of hydroxy-sodalite.

EXAMPLE VI

From a batch of perlite analyzing 77.9% $SiO_2$, 10.3% $Al_2O_3$, 3.4% $Na_2O$, and 4.8% $K_2O$, 15.8 grams were weighed out and fused at 330–340° C. with 16.8 grams of sodium hydroxide and 33.8 grams of water for 19.2 hours. With 19.2 grams of the fusion product were blended 5.3 grams of sodium aluminate containing 31.0 wt.-percent $Na_2O$, 45.1 wt.-percent $Al_2O_3$ and 23.0 wt.-percent $H_2O$, and 136.2 grams of water. The reactant mixture then had a composition in terms of oxide-mole ratios of:

$$Na_2O/SiO_2 = 1.3$$
$$SiO_2/Al_2O_3 = 4.0$$
$$H_2O/Na_2O = 40$$

This mixture was digested for 22.5 hours at 95–100° C. The solids were separated from the liquor by filtration, washed with distilled water to a pH of 10–10.5 and oven-dried at 110° C. X-ray analysis characterized the product as 85–88% $Na_2X$. Adsorption measurements indicated a 90% $Na_2X$ content.

EXAMPLE VII

In a nickel crucible nested in a 400-ml. beaker, 31.4 grams of sodium hydroxide were dissolved in 30 grams of water. To this was added 20 grams of tripoli (opalite). This mixture was heated for 16 hours at 350° C. Of the fusion product, 22.2 grams were blended with 7.6 grams of sodium aluminate and 147.5 grams of water to give a reactant mixture having the over-all composition in terms of oxide-mole ratios of:

$$Na_2O/SiO_2 = 1.4$$
$$SiO_2/Al_2O_3 = 5$$
$$H_2O/Na_2O = 35$$

This reactant mixture was digested for 24 hours at 100° C. The solids were filtered, washed with distilled water to pH about 10, and oven dried at 110° C. X-ray analysis characterized the product as having an $Na_2X$ content of 76%, along with 20% $Na_2B$. Adsorption measurements indicated the $Na_2X$ content was actually 86%, along with a small amount of $Na_2B$.

What is claimed is:

1. An improved method for producing zeolite A which comprises the steps of: providing a starting compound consisting of non-kaolinitic alumino-silicate mineral, having in the composition thereof $SiO_2$ and $Al_2O_3$ in a molar ratio between 1 and 13, in admixture with an alkali metal hydroxide, fusing said admixture at a temperature between 330 and 370° C., forming with said fused admixture an aqueous reactant mixture having in the aggregate oxides of Al, Si and Na, and $H_2O$ defined in terms of oxide mole ratios about as follows:

$$Na_2O/SiO_2 = 1.0-3.0$$
$$SiO_2/Al_2O_3 = 0.5-1.3$$
$$H_2O/Na_2O = 35-200$$

maintaining said reactant mixture at a temperature within the range of 20 to 120° C. until crystals of zeolite A form, thereafter separating the crystals from the mixture and activating said crystals to remove at least a part of the water of hydration.

2. An improved method for producing zeolite A which comprises the steps of: providing a starting compound having a particle size of less than about 30 mesh and consisting of a non-kaolinitic alumina and silica containing mineral, having in the composition thereof $SiO_2$ and $Al_2O_3$ in a molar ratio between 1 and 13, in admixture with NaOH in an amount such that the weight ratio of said mineral to NaOH is within the range of .75 to 1.5, fusing said admixture at a temperature between 330 and 370° C. for 6 to 18 hours, forming with said fused admixture and an aqueous reactant mixture having in the aggregate oxides of Al, Si and Na, and $H_2O$ defined in terms of oxide mole ratios about as follows:

$$Na_2O/SiO_2 = 1.0\text{-}3.0$$
$$SiO_2/Al_2O_3 = 0.5\text{-}1.3$$
$$H_2O/Na_2O = 35\text{-}200$$

maintaining said reactant mixture at a temperature within the range of 20 to 120° C. until zeolite A crystallizes, thereafter separating the crystals from the mixture and activating to remove at least a part of the water of hydration.

3. A method for producing zeolite A substantially as described in claim 1 wherein the reactant mixture contains in the aggregate oxides of Al, Si and Na, and $H_2O$ defined in terms of oxide mole ratios about as follows:

$$Na_2O/SiO_2 = 1.3\text{-}2.5$$
$$SiO_2/Al_2O_3 = 0.8\text{-}3.0$$
$$H_2O/Na_2O = 35\text{-}200$$

4. An improved method substantially as described in claim 1 wherein the pulverized starting compound has in the composition thereof at least one mineral from the group consisting of basalt, obsidian, perlite, bauxite, andalusite, albite, clinoptilolite, kyanite, diatomite and tripoli.

5. A method substantially as described in claim 1 wherein the starting compound is thermally fused at a temperature between 330° C. and 370° C. for a period up to 16 hours.

6. A method substantially as described in claim 1 wherein the starting compound is in particulated form not exceeding 30 mesh and comprises a non-kaolinitic alumino-silicate mineral material having in the composition thereof $SiO_2$ and $Al_2O_3$ in the molar ratio between 1 and 13 and which has been provided with sodium hydroxide in an amount such that the weight ratio of said mineral material to sodium hydroxide is within the range of .75 to 1.5.

7. An improved method for producing synthetic crystalline zeolite X which comprises the steps of providing a pulverized starting compound consisting of a non-kaolinitic aluminum silicate mineral material, having in the composition thereof $SiO_2$ and $Al_2O_3$ in a molar ratio between 1 and 13, in admixture with an amount of an alkali metal hydroxide, fusing said starting admixture at a temperature of between 330° C. and 370° C., forming an aqueous reactant mixture including said fused admixture, said solution having in the aggregate thereof oxides of Al, Si and Na, and $H_2O$ defined in oxide mole ratios within the ranges of:

$$Na_2O/SiO_2 = 1.2\text{-}1.5$$
$$SiO_2/Al_2O_3 = 3\text{-}5$$
$$H_2O/Na_2O = 35\text{-}65$$

and digesting said aqueous reactant mixture at a temperature within the range of 20 to 120° C. to produce sodium zeolite X.

8. An improved method substantially as described in claim 7 wherein the pulverized starting compound has in the composition thereof at least one mineral from the group consisting of basalt, obsidian, perlite, bauxite, andalusite, albite, clinoptilolite, kyanite, diatomite and tripoli.

9. A method substantially as described in claim 7 wherein the starting compound is thermally fused at a temperature between 330° C. and 370° C. for a period up to 40 hours.

10. A method substantially as described in claim 7 wherein the starting compound has a particle size not exceeding 30 mesh and comprises a non-kaolinitic aluminum silicate mineral having in the composition thereof $SiO_2$ and $Al_2O_3$ in a molar ratio between 1 and 12, and which has been provided with an amount of sodium hydroxide in an amount such that the weight ratio of said mineral to said sodium hydroxide is within the range of 0.25 to 1.2.

11. An improved method of producing synthetic crystaline sodium zeolite X which comprises the steps of providing a pulverized starting compound having particles of less than 30 mesh comprising a non-kaolinitic aluminosilicate mineral, having in the composition thereof $SiO_2$ and $Al_2O_3$ in a molar ratio between 1 and 13, in admixture with an amount of NaOH such that the weight ratio of said mineral to said NaOH is within the range of 0.25 to 1.2, thermally treating said admixture at a temperature within the range of 330° C.-370° C. for a period between 8 and 40 hours, forming an aqueous reactant mixture, including said fused admixture in particulated form, such that said reactant mixture has in the aggregate oxides of Al, Si and Na, and $H_2O$ defined in oxide mole ratios within the range of:

$$Na_2O/SiO_2 = 1.2\text{-}1.5$$
$$SiO_2/Al_2O_3 = 3\text{-}5$$
$$H_2O/Na_2O = 35\text{-}65$$

and digesting said aqueous reactant mixture at a temperature within the range of 20 to 120° C. to produce sodium zeolite X.

12. An improved method for producing zeolite A which comprises the steps of: providing a starting material consisting of a non-kaolinitic alumina and silica containing mineral having in the composition thereof a molar $SiO_2$ to $Al_2O_3$ ratio between 1 and 13 and an alkali metal hydroxide, fusing said materials at a temperature between 330 and 370° C., forming with said fused materials an aqueous reactant mixture having in the aggregate oxides of Al, Si and Na, and $H_2O$ defined in terms of oxide mole ratios about as follows:

$$Na_2O/SiO_2 = 1.0\text{-}3.0$$
$$SiO_2/Al_2O_3 = 0.5\text{-}1.3$$
$$H_2O/Na_2O = 35\text{-}200$$

digesting said reactant mixture at about room temperature and thereafter digesting said reactant mixture at a temperature within the range of 20 to 120° C. until crystals of zeolite A form, thereafter separating the crystals from the mixture and activating said crystals to remove at least a part of the water of hydration.

13. A process in accordance with claim 12 wherein said reactant mixture is digested at about room temperature and thereafter is digested at a temperature ranging from about 75–100° C.

14. An improved method substantially as described in claim 12 wherein the starting material has in the composition thereof at least one mineral selected from the group consisting of basalt, obsidian, perlite, bauxite, analusite, albite, clinoptilolite, kyanite, diatomite and tripoli.

15. A method substantially as described in claim 12 wherein the starting material is thermally fused at a temperature between 330° C. and 370° C. for a period up to 16 hours.

16. A method substantially as described in claim 12 wherein the starting compound is in a particulate form not exceeding 30 mesh and comprises a non-kaolinitic alumina and silica containing mineral material having in the composition thereof a molar $SiO_2$ to $Al_2O_3$ ratio between 1 and 13 and which has been provided with sodium hydroxide in an amount such that the weight ratio of said mineral material to sodium hydroxide is within the range of 0.75 to 1.5.

17. An improved method for producing zeolite A which comprises the steps of: providing a starting compound having a particle size of less than about 30 mesh and consisting of a non-kaolinitic alumina and silica containing mineral having in composition thereof a molar $SiO_2$ to $Al_2O_3$ ratio between 1 and 13, and NaOH in an amount such that the weight ratio of said mineral to NaOH is within the range of 0.75 to 1.5, fusing said materials at a temperature between 330 and 370° C. for 6 to 18 hours, forming with said fused materials an aqueous reactant mixture having in the aggregate oxides of Al, Si and Na and $H_2O$ defined in terms of oxide mole ratios about as follows:

$$Na_2O/SiO_2 = 1.0-3.0$$
$$SiO_2/Al_2O_3 = 0.5-1.3$$
$$H_2O/Na_2O = 35-200$$

digesting said reactant mixture at about room temperature and thereafter digesting said reactant mixture at a temperature within the range of 20 to 120° C. until zeolite A crystallizes, thereafter separating the crystals from the mixture and activating the separated crystals to remove at least a part of the water of hydration.

18. An improved method for producing synthetic crystalline zeolite X which comprises the steps of providing a pulverized starting compound consisting of a non-kaolinitic alumina and silica containing mineral material having in the composition thereof a molar $SiO_2$ to $Al_2O_3$ ratio between 1 and 13, together with an amount of an alkali metal hydroxide, fusing said starting compound and said hydroxide at a temperature between 330° C. and 370° C. to form a fused mixture, forming an aqueous reactant mixture including said fused mixture, said aqueous reactant mixture having in the aggregate oxides of Al, Si and Na, and $H_2O$ defined in oxide mole ratios within the ranges of:

$$Na_2O/SiO_2 = 1.2-1.5$$
$$SiO_2/Al_2O_3 = 3-5$$
$$H_2O/Na_2O = 35-65$$

digesting said reactant mixture at about room temperature and thereafter digesting said reactant mixture at a temperature within the range of 20 to 120° C. to produce sodium zeolite X.

19. An improved method for producing synthetic crystalline sodium zeolite X which comprises the steps of providing a pulverized starting compound consisting of a non-kaolinitic alumina and silica containing mineral material having in the composition thereof a molar $SiO_2$ to $Al_2O_3$ ratio between 1 and 13, together with an amount of an alkali metal hydroxide, fusing said starting compound and said hydroxide at a temperature between 330° C. and 370° C. to form a fused mixture, forming an aqueous reactant mixture including said fused mixture, said reactant mixture having in the aggregate oxides of Al, Si and Na and $H_2O$ defined in oxide mole ratios within the ranges of:

$$Na_2O/SiO_2 = 1.2-1.5$$
$$SiO_2/Al_2O_3 = 2-5$$
$$H_2O/Na_2O = 35-65$$

digesting said reactant mixture at about room temperature and thereafter digesting said reactant mixture at a temperature ranging from 75–100° C. to produce sodium zeolite X.

20. An improved method substantially as described in claim 19 wherein the pulverized starting material has in the composition thereof at least one mineral selected from the group consisting of basalt, obsidian, perlite, bauxite, andalusite, albite, clinoptilolite, kyanite, diatomite and tripoli.

21. A method substantially as described in claim 19 wherein the starting material is thermally fused at a temperature between 330° C. and 370° C. for a period up to 40 hours.

22. A method substantially as described in claim 19 wherein the starting compound has a particle size not exceeding 30 mesh and comprises a non-kaolinitic alumina and silica containing mineral having in the composition thereof a molar $SiO_2$ to $Al_2O_3$ ratio between 1 and 13, and which has been provided with an amount of sodium hydroxide in an amount such that the weight ratio of said mineral to said sodium hydroxide is within the range of 0.25 to 1.2.

23. An improved method of producing synthetic crystalline sodium zeolite X which comprises the steps of providing a pulverized starting compound, having particles of less than 30 mesh, comprising an alumino-silicate mineral having in the composition thereof a molar $SiO_2$ to $Al_2O_3$ ratio between 1 and 13, and an amount of NaOH such that the weight ratio of said mineral to said NaOH is within the range of 0.25 to 1.2, thermally treating said starting material and NaOH at a temperature within the range of 330° C. to 370° C. for a period between 8 and 40 hours, forming an aqueous reactant mixture including said fused compound in particulated form such that said reactant mixture has in the aggregate oxides of Al, Si and Na and $H_2O$ defined in oxide mole ratios within the range of:

$$Na_2O/SiO_2 = 1.2-1.5$$
$$SiO_2/Al_2O_3 = 3-5$$
$$H_2O/Na_2O = 35-65$$

digesting said reactant mixture at about room temperature and thereafter digesting said reactant mixture at a temperature ranging from 75–100° C. to produce sodium zeolite X.

References Cited in the file of this patent

UNITED STATES PATENTS

| | | |
|---|---|---|
| 891,677 | Dieffenbach | June 23, 1908 |
| 943,535 | Gans | Dec. 14, 1909 |
| 1,131,503 | Gans | Mar. 9, 1915 |
| 1,140,262 | Gans | May 18, 1915 |
| 2,100,944 | Davies | Nov. 30, 1927 |
| 2,882,243 | Milton | Apr. 14, 1959 |
| 2,882,244 | Milton | Apr. 14, 1959 |
| 2,979,381 | Gottstine et al. | Apr. 11, 1961 |